United States Patent [19]

Akerberg

[11] Patent Number: 5,486,557
[45] Date of Patent: Jan. 23, 1996

[54] FURFURYL ALCOHOL-FORMALDEHYDE RESINS

[75] Inventor: Denis W. Akerberg, Lafayette, Ind.

[73] Assignee: QO Chemicals, Inc., West Lafayette, Ind.

[21] Appl. No.: 291,170

[22] Filed: Aug. 16, 1994

[51] Int. Cl.$^6$ .............................. C08K 5/15; C08K 5/353; C08K 5/54

[52] U.S. Cl. ..................... 524/111; 524/262; 524/549; 523/144

[58] Field of Search ....................... 524/262, 111, 524/549; 523/144

[56] References Cited

U.S. PATENT DOCUMENTS

| 2,343,972 | 3/1944 | Harvey | 260/67 |
|---|---|---|---|
| 3,681,420 | 8/1972 | Brown et al. | 549/214 |
| 4,243,780 | 1/1981 | Kruglikov et al. | 525/518 |
| 4,439,568 | 3/1984 | Bogner | 524/111 |
| 4,451,577 | 5/1984 | Coss | 502/167 |
| 4,543,373 | 9/1985 | Kawiec et al. | 524/549 |
| 4,694,905 | 9/1987 | Armbruster | 166/280 |

FOREIGN PATENT DOCUMENTS

| 1200336 | 2/1986 | Canada . |
|---|---|---|
| 109710 | 4/1982 | Poland . |

OTHER PUBLICATIONS

Abstract: CA(4): 24672Z, 1982.
Abstract: CA98(2): 5046c, 1982.
Pp. 59–61 of paper presented at "Wood Adhesives Research, Applications, and Needs" Symposium held at Madison, Wisconsin on Sep. 23–25, 1980.

*Primary Examiner*—Paul R. Michl
*Assistant Examiner*—Olga Asinovsky
*Attorney, Agent, or Firm*—Woodard, Emhardt, Naughton, Moriarty & McNett

[57] ABSTRACT

A composition for use as a binder for composite materials comprising a water-compatible furfuryl alcohol-formaldehyde resin and a minor amount of gamma-aminopropyltrimethoxysilane.

6 Claims, No Drawings

FURFURYL ALCOHOL-FORMALDEHYDE RESINS

This invention relates to furan resins and more particularly furfuryl alcohol-formaldehyde resins which are useful as binders for composite articles.

Resinous furfuryl alcohol-formaldehyde condensation products which when cured or set are useful as binders in the manufacture of composite articles such as wood particle boards, wafer board, oriented fiber board, matboard, hardboard, pressboard, various fiberglass articles and the like, and in the manufacture of low density non-molded composite articles such as acoustical tile and thermal insulating mats or boards, or to form insulation batting from glass fibers, When using resins as binders it is desirable that the resins exhibit compatibility with water so as to permit dilution and thus facilitate application to the composite materials such as by spraying. To this end, the copending U.S. application Ser. No. 08/176,341 filed Dec. 29, 1993 by George S. Everett, George R. MacLennan and Michael C. Chen discloses furfuryl alcohol-formaldehyde resins which are highly compatible or dilutable with water and are very advantageous for use as binders for composite materials.

The furan resins described in the copending application Ser. No. 08/176,341 are referred to herein as "highly soluble furan-formaldehyde resins" and are characterized by exhibiting very high compatibility with water and when diluted with an excess amount of water 90% or more, preferably at least 95%, of the resin is soluble in the water. For example, when 5 grams of resin is added to 95 grams of water, at least 4.5 grams of the resin is soluble in the water. The high water compatibility of the resinous compositions is advantageous in that undesirable amounts of resin need not be discarded prior to use as a binder and greatly improved resin distribution on a composite substrate can be achieved with the resins having high water compatibility.

As used herein, the term "Water Insolubles" means the amount of residue (or solids) which settles out, after standing at least 8 hours in water, when 5.0 grams resin is added to 95.0 grams deionized water. The percentage of water insolubles can be calculated by the formula:

$$\% \text{ Water Insolubles} = \frac{\text{Weight of Residue}}{5.0 \text{ grams resin}} \times 100\%$$

As used herein the term "Water Compatibility" means the amount of resin that is soluble, after standing at least 8 hours in water, when 5.0 grams of resin is added to 95.0 grams deionized water. The percentage of water compatibility can be calculated by the formula:

$$\% \text{ Water Compatibility} = \frac{5.0 \text{ grams resin} - \text{weight of residue}}{5.0 \text{ grams resin}} \times 100\%$$

As can be seen, there is an inverse relationship between water compatibility and water insolubles—the lower the amount of water insolubles, the greater the water compatibility.

The "highly soluble furan-formaldehyde resins" are prepared by reacting furfuryl alcohol with an excess of formaldehyde, such excess being on the order of at least 2 moles of formaldehyde per mole of furfuryl alcohol. More preferably, the molar ratio of furfuryl alcohol to formaldehyde is in the range of at least about 1:2.50 to 1:3.50. The reaction is catalyzed with an organic acid and conducted at an elevated temperature, say at a temperature of about 110° C. to 130° C., under a pressure of say 5 to 50 pounds per square inch and a pH of about 4.00 to 4.50. The formaldehyde can be employed in various forms, such as paraformaldehyde.

Under these conditions the reaction of furfuryl alcohol and formaldehyde is conducted at a controlled rate for a period of say 4.0 to 9.0 hours. During the reaction period the reaction progress is followed by the decline in the free furfuryl alcohol content of the reaction mixture. The reaction is allowed to continue at an elevated temperature until the furfuryl alcohol content has been reduced to the desired level of not more than about 5% by weight and preferably less than 0.2% by weight of the reaction mixture. When the desired low level of free furfuryl alcohol has been achieved, the reaction mixture is cooled rapidly, such as by immersing in an ice bath, to room temperature (approximately 70° F.) to stop the reaction. During the cooling down period and when the temperature has dropped to about 70° F. or below a sample of the product resin is taken from the reaction mixture for determination of the free formaldehyde content. A formaldehyde scavenger such as melamine or urea or the like is then added to react with the free or unreacted formaldehyde in the reaction mixture. The scavenger is added at or below room temperature. Typically, the mixture is then stirred for 1 to 2 hours to permit reaction of the scavenger with the formaldehyde. An exotherm is observed which is indicative of reaction of the scavenger with the free formaldehyde. Preferably, in addition to the formaldehyde scavenger ammonia is added in an amount to reduce the final free formaldehyde content of the reaction mixture to less than about 0.5% by weight thereof.

A weak organic monomeric or polymeric carboxylic acid having a pKa of not less than about 4, such as adipic, acetic, propionic, butyric, succinic and the like, is used as a catalyst in an amount of about 1 to 10% by weight of the furfuryl alcohol and an alkali such as sodium hydroxide is utilized to maintain the reaction pH in the range of about 4.0 to 4.5.

The highly soluble furan-formaldehyde resins can be diluted with water and applied as a binder for composite materials in accordance with known manufacturing procedures and the substrate having the binder applied thereto subjected to heat so as to cure the binder into a rigid thermoset condition. Generally temperatures on the order of 250° to 450° F. are sufficient to cure the resinous binders. Curing catalysts such as those described in a paper by Goldstein and Dreher, "Stable Furfuryl Alcohol Impregnating Solutions", Ind. Eng. Chem., Vol. 52, No. 1, January 1960, p. 58 and the like can be utilized to accelerate curing of the binder as is known in the art. Examples of such catalysts are cadmium nitrate, cobalt nitrate, nickel nitrate, zinc nitrate, ammonium nitrate, ammonium chloride, aluminum sulfate, copper sulfate, ammonium sulfate, malic acid, citric acid, tartaric acid, malonic acid, maleic acid, oxalic acid, chloroacetic acid and salicylic acid.

Even strong acids such as toluenesulfonic acid, benzenesulfonic acid, dichloroacetic acid, trichloroacetic acid, phosphoric acid, etc. can be used to cure these resinous binders in systems that are not heat cured.

In addition to compatibility with water, it is highly desired that resins used as binders for composite materials when cured and set exhibit resistance to water both in the form of vapor as encountered in high humidity environments and liquid water.

Accordingly, it is a principal object of the present invention to improve water resistance of furfuryl alcohol-formaldehyde resins and particularly furfuryl alcohol-formaldehyde resins useful as binders for composite materials.

The improvement in water resistance of the binder resins is accomplished according to the invention by incorporation of gamma-aminopropyltrimethoxysilane with a water-compatible furfuryl alcohol-formaldehyde resin. This silane is used in amounts of from about 0.15 to 0.30% by weight of resin. The silane is added to the resin just prior to curing and setting of the resin. Preferably, the silane is incorporated in a binder composition containing the resin and a solvent therefor, such as water.

By "water-compatible furfuryl alcohol-formaldehyde resin" is meant a resin which is formed by reacting furfuryl alcohol and formaldehyde and which resin is dilutable with water in amounts of 90% or more by weight (i.e., contains not more than 10% by weight insoluble materials.)

The invention and the advantages thereof are further shown by the following examples.

EXAMPLE 1

This example illustrates the preparation of a preferred resinous binder composition using 2.75 moles of formaldehyde per mole of furfuryl alcohol. 1,146.4 pounds of furfuryl alcohol (11.70 pound moles), 1,050,0 pounds of paraformaldehyde (91–93% purity; 32.18 pound moles), 9.3 pounds sodium hydroxide (50% aqueous), and 171.9 pounds of adipic acid were charged to a 350 gallon reactor. This mixture was agitated at 84°–86° C. and 5–10 psi for 4 hours to insure the paraformaldehyde was in solution. The mixture was heated to 110° to 116° C. with 14–23 pounds per square inch and held for 3.1 hours until the percent furfuryl alcohol had been reduced to 1.8%. The product was then cooled to 60° C. and 252 pounds of 50% aqueous urea solution was added. This mixture was allowed to cook for one hour at 65° C. at which time 237 pounds of 28–30% aqueous ammonia (3 weight percent of the resin) was added. The total product was then allowed to cook for four hours at 86°–92° C. and 8–50 pounds per square inch. The product was then cooled to 3020 C. and drummed through a 50 micron filter. The analysis of the resin is given below.

| % furfuryl alcohol | % water insoluble | % free formaldehyde | % BHMF | % water | viscosity | pH |
|---|---|---|---|---|---|---|
| 0.17 | 0.16 | 0.68 | 12.6 | 25.3 | 650 cps | 4.8 |

EXAMPLE 2

Six mixes were prepared having the following composition:

750.00 grams glass shot.
46.20 grams resin as prepared in Example 1.
33.40 grams distilled water.
1.60 grams maleic acid.
1.30 grams ammonium nitrate.
0.10 gram of a silane.

In Mix #1, gamma-glycidoxypropyltrimethoxysilane was used; in Mix #2, gamma-aminopropyltriethoxysilane was used; in Mix #3, amino alkyl silicon/water solution was used; in Mix #4, modified gamma-aminopropyltriethoxysilane was used; in Mix #5, gamma-aminopropyltrimethoxysilane was used; and in Mix #6, bis(trimethoxysilylpropyl)amine was used.

Binder solutions were prepared by blending resin and water, adding acid and mixing until dissolved, and then adding the silane. This mixture was then added to the glass shot and mixed for four minutes. Twelve ½ inch thick tensile dog-bone shaped biscuits were prepared from each mix. After the so-called biscuit is formed, it is placed in a machine adapted to determine what the tensile and ultimate yield strengths of the part thus formed are. The dog bone biscuits are generally in the shape of an hour glass with the ends of the biscuits being approximately 1.5 inches across and the center section being 1.0 inch across. The thickness of the biscuits can be one-quarter inch, one-half inch, or one inch, depending on the type of test being performed. The biscuits are prepared from the above mixes by placing the mix into twelve cavity "gang" molds. The mixes are then hand tamped to insure uniformity and screeded to the mold height. The uncured biscuits are then removed from the mold, placed on a metal plate, and put in an oven to cure. Once cured, the biscuits are removed from the oven and allowed to cool to ambient temperature. The tensile tests are conducted at ambient temperature using a Detroit Testing Machine Company tensile tester model CST. This machine is equipped with a set of "jaws" of sufficient size and shape to hold the biscuits firmly in place. The bottom "jaw" is fixed in place while the upper "jaw" moves in an upward motion exerting a tensile force on the biscuits. This force is applied at a controlled rate and the load pounds needed to fracture the biscuit is digitally recorded. A set of six biscuits are normally used to determine the average tensile strength within a given test parameter. Six specimens (not treated) from each of the above mixes were stored at room temperature while six specimens (treated) were subjected to 4 hours in boiling water, 16 hours in an air circulating oven at 60° C., 4 more hours in boiling water, and 2 hours at 120° C. in an air circulating oven. After the treated specimens returned to room temperature tensile strengths were determined on all specimens. The following results show the tensile strengths in pounds per square inch of the specimens.

| Mix | #1 | #2 | #3 | #4 | #5 | #6 |
|---|---|---|---|---|---|---|
| Not treated | 958 | 712 | 876 | 796 | 868 | 912 |
| Treated | 104 | 108 | 112 | 88 | 231 | 142 |

As seen from the above results, mix #5, which included the gamma-aminopropyltrimethoxysilane, exhibited highly superior tensile strength after being tested severely in boiling water.

Those modifications and equivalents which fall within the spirit of the invention are to be considered a part thereof.

What is claimed is:

1. A composition for use as a binder for composite materials comprising:

a water-compatible furfuryl alcohol-formaldehyde resins said resin comprising the reaction product of furfuryl alcohol with formaldehyde in a molar ratio of at least 1:2, said resin containing not more than 10% by weight of water insoluble material; and from about 0.15 to 0.30% by weight of gamma-aminopropyltrimethoxysilane based on the weight of the resin.

2. The composition of claim 1 in which said resin further contains not more than about 5% by weight of furfuryl alcohol.

3. The composition of claim 1 in which said resin comprises the reaction product of furfuryl alcohol with formaldehyde in the presence of a weak organic acid having a pKa of at least about 4.

4. The composition of claim 3 in which the organic acid is selected from the group consisting of adipic, acetic, propionic, butyric and succinic acids.

5. The composition of claim 3 in which said resin further contains not more than about 5% by weight of furfuryl alcohol.

6. The composition of claim 1 wherein said resin contains not more than about 5% by weight of water insolubles.

\* \* \* \* \*

UNITED STATES PATENT AND TRADEMARK OFFICE
CERTIFICATE OF CORRECTION

PATENT NO. : 5,486,557
DATED : January 23, 1996
INVENTOR(S) : Denis W. Akerberg

It is certified that error appears in the above-indentified patent and that said Letters Patent is hereby corrected as shown below:

In col. 1, line 67, please delete "10".

In col. 3, line 40, please change "3020" to --30°--.

Signed and Sealed this

Eighteenth Day of June, 1996

Attest:

BRUCE LEHMAN

Attesting Officer        Commissioner of Patents and Trademarks